US008818947B2

(12) United States Patent
Gutberlet et al.

(10) Patent No.: US 8,818,947 B2
(45) Date of Patent: Aug. 26, 2014

(54) LANDSCAPE TRANSFORMATION REPLICATION SERVER

(75) Inventors: Wolfgang Gutberlet, Walldorf (DE); Klaus Daschakowsky, Bad Schoenborn (DE); Guenter Weber, Mosbach (DE); Jochen Merkel, Karlsdorf-Neuthard (DE)

(73) Assignee: SAP AG, Walldorf (DE)

( * ) Notice: Subject to any disclaimer, the term of this patent is extended or adjusted under 35 U.S.C. 154(b) by 237 days.

(21) Appl. No.: 13/298,212

(22) Filed: Nov. 16, 2011

(65) Prior Publication Data

US 2013/0124473 A1 May 16, 2013

(51) Int. Cl.
*G06F 17/30* (2006.01)

(52) U.S. Cl.
CPC ............................... *G06F 17/30578* (2013.01)
USPC ............................ 707/634; 707/621; 709/203

(58) Field of Classification Search
USPC .................................... 707/634, 201; 709/203
See application file for complete search history.

(56) References Cited

U.S. PATENT DOCUMENTS

| 2009/0177710 | A1* | 7/2009 | Holenstein et al. ........... 707/201 |
| 2010/0030730 | A1 | 2/2010 | Shang et al. |
| 2010/0121914 | A1* | 5/2010 | Jeon et al. ..................... 709/203 |

FOREIGN PATENT DOCUMENTS

| EP | 1465085 A2 | 10/2004 |
| GB | 2425376 A | 10/2006 |

OTHER PUBLICATIONS

Delmolino, D., "Strategies and Techniques for Using Oracle7 Replication", Retrieved from the Internet: <URL:http://www.indiana.edu/dbateam/resources/tips/ddelmoli.pdf>.
Extended European Search Report dated Jun. 18, 2013, for corresponding European application No. 12007484.4.

* cited by examiner

*Primary Examiner* — Belix M Ortiz Ditren
(74) *Attorney, Agent, or Firm* — Mintz Levin Cohn Ferris Glovsky and Popeo, P.C.

(57) ABSTRACT

Methods and apparatus, including computer program products, are provided for data replication. In one aspect, there is provided a computer-implemented method. The method may include providing an initial load of a data item from a source system to a target system, wherein the data item is associated with a trigger maintained at the source system; recording a change in a log, when a change to the data item at the source system causes the trigger to prompt the recording; extracting the change from the log to enable at least a confirmation of a consistency of the change; and providing the extracted change to a replication server configured to write the change to the target system. Related apparatus, systems, methods, and articles are also described.

20 Claims, 8 Drawing Sheets

LANDSCAPE TRANSFORMATION REPLICATION SERVER

FIELD

The present disclosure generally relates to data processing and, in particular, replication of data.

BACKGROUND

Business system applications may be coupled to one or more database systems to store data used in connection with the business. Database systems are typically employed in computing systems to store and organize information. For example, a database system may include a database and at least one application program for accessing the database. Databases are typically considered to be a self-describing collection of records, in which each record may be a representation of some physical or conceptual object that contains information. The information contained in a record may be organized in tables based on attributes. For example, if a database were used to keep track of employees in a corporation, each record might include attributes such as for example a first name, last name, home address, and telephone number. Records in a database are typically accessed using a key included in tables of the database system.

SUMMARY

In one aspect there is provided a method. The method may include providing an initial load of a data item from a source system to a target system, wherein the data item is associated with a trigger maintained at the source system; recording a change in a log, when a change to the data item at the source system causes the trigger to prompt the recording; extracting the change from the log to enable at least a confirmation of a consistency of the change; and providing the extracted change to a replication server configured to write the change to the target system.

In some implementations, the above-noted aspects may further include additional features described herein including one or more of the following. The trigger may include a database trigger. The data item may be written to a database table at the target system. The database table may include at least one of a plurality of database tables of at least one of an in-memory database and a column-oriented database. The replication server may initiate the initial load of the data item from the source system to the target system, wherein the replication server comprises at least a controller. The change may include at least one of an insert, a create, and a delete. The extracting may further include determining the consistency based on a comparison of the log and a table including the data item at the source system.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
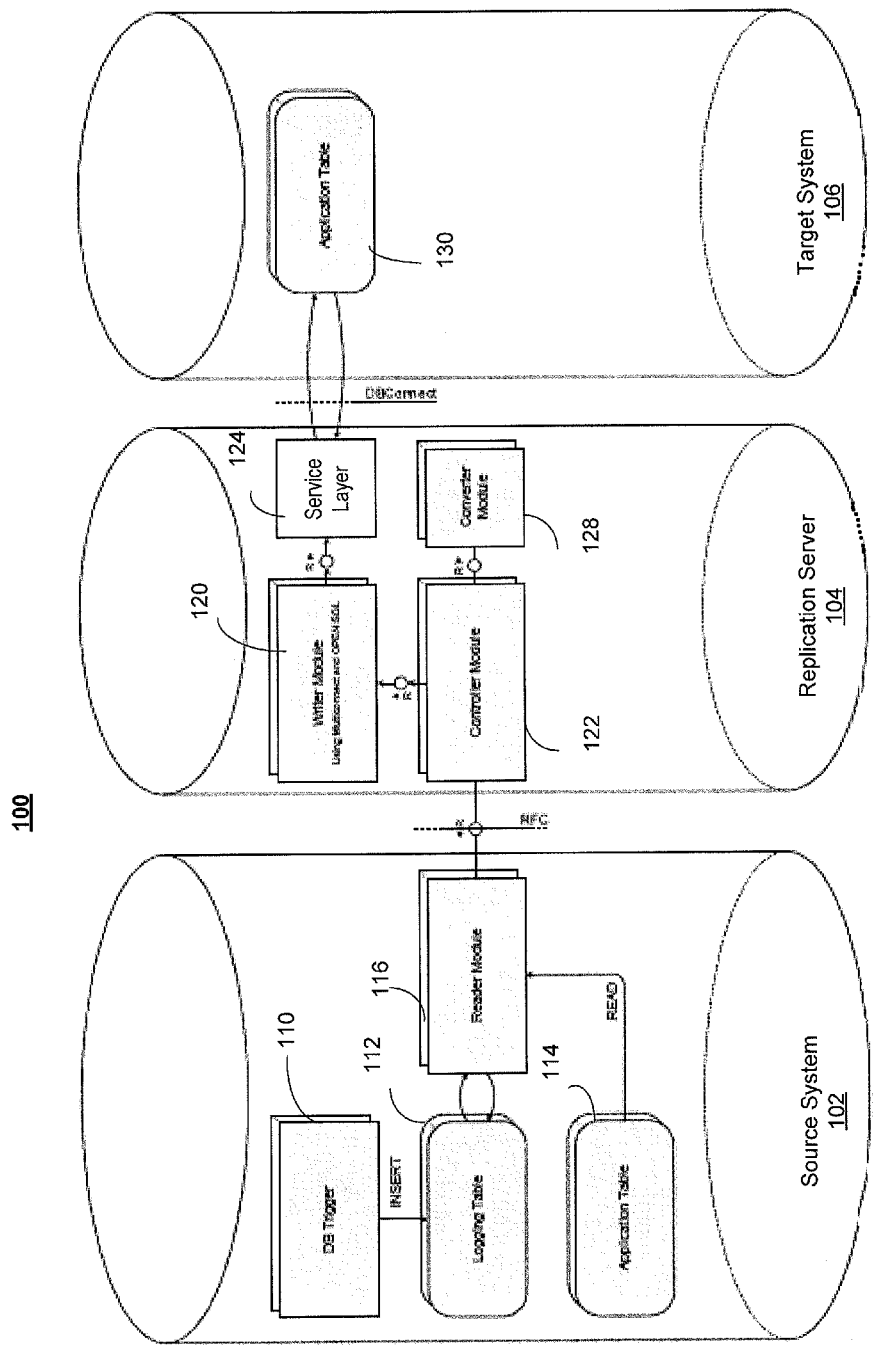
FIG. 1 depicts a block diagram of an example system for replicating data.

Like labels are used to refer to same or similar items in the drawings.

DETAILED DESCRIPTION

The subject matter disclosed herein relates to copying data from a source system to a target system and then recording changes occurring to the data at the source system and posting those changes to the target system. For example, a first, source system may be implemented as an enterprise resource planning application, and a second, target system may be implemented as a database, such as for example an in-memory database. In this example, at least a portion of the data from the target system is stored and thus serves as an initial load on the target system. Next, any changes, such as for example a create, an update, a delete, and the like, occurring on the portion of the data (which is stored in, for example, a database table at the source system) triggers a corresponding update to the data portion replicated on the second, target system. The subject matter disclosed herein implements at least database triggers at the source system to ensure that any changes to the data at the source system are replicated to, and thus synchronized with, the second, target system.

FIG. 1 depicts a system 100 including a source system 102, a replication server 104, and a target system 106.

The source system 102 may include at least one processor and at least one memory including instructions, which when executed by the at least one processor provides a system, such as for example a business system application, an enterprise resource planning system, and the like. The source system 102 may include a database system and may be coupled to the replication server 104. In some implementations, the source system 102 may include database trigger 110 for triggering synchronization with the target system 106, logging table 112 for recording (e.g., storing) any changes made to data which is the subject of a trigger at database trigger 110, application table 114 which may include one or more tables, such as for example database tables, and reader module 116 for reading any changes in the logging table 112. During an initial load of data to the target system 106, the reader module 116 reads data from the application table 114, and after the initial load, the reader module 116 reads from the logging table 112 and application table 114 to ensure changes are posted to the target system 106.

The replication server 104 may include at least one processor and at least one memory including instructions, which when executed by the at least one processor provides replication to target system 106 of at least a portion of the data at source system 102. In addition, the replication server 104 may be coupled to the source system 102 and target system 106. Moreover, the replication server 104 may include writer module 120 for writing changes received from the source system to the target system 106, controller module 122 for accessing the reader module at source system 102, service layer 124 for interfacing the replication server 104 with the target server 106, and converter module 128 for making conversions between data types of the source system and data types of the target system.

The target system 106 may include at least one processor and at least one memory including instructions, which when executed by the at least one processor provides persistent storage of data replicated from the source system 102 to the target system 106. The persistent storage may be implemented as an in-memory database, although other types of persistent storage may be used as well. The target system 106 may include one or more tables, such as for example application table 130 corresponding to a database where changes to data are posted.

The target system 106 may be implemented as any type of database. However, in some implementations, the target system 106 may include a database (which would include application table 130). The database may be implemented as an in-memory database. Rather than using disk-based storage, the in-memory database keeps most, if not all, of the relevant database data in main-memory, such as for example dynamic random access memory (DRAM), static random access memory, etc. Moreover, the database may also be implemented as a column-oriented database, although a row-oriented database may be used as well. A column-oriented database refers to a database management system configured to store relevant data based on columns, not rows. On the other hand, a row-oriented database refers to a database management system configured to store relevant data based on rows, not columns.

To illustrate the operation of system 100, the following example is provided. The replication server 104 may initiate an initial load of data (e.g., application data 114, and/or any other data designated for loading to target system 106) from the source system 102 to target system 106. For example, the source system 102 may include one or more tables, such as for example application table 114 (which may be implemented as part of a database), and portions of tables may be replicated to target system 106, which includes a database containing application table 130. Once this data is replicated to target system 106, there is an on-going need to keep the replicated data at target system 106 synchronized to source system 102. Specifically, when a transaction at source system 102 causes a change (e.g., a create, an update, a delete, and the like) to the data at source system 102, database triggers are pulled causing entries to the logging table 112, which are detected by reader module 116.

For example, when an application at the source system 102 executes a delete of an item, such as for example a table named "Purchase_Order," the source system 102 checks for database triggers at database trigger 110. Database trigger 110 may include one or more triggers for each database table, such as for example application table 114, subject to replication to target system 106. For example, a database trigger may be implemented as a database object linked to a database table, such as for example application table 114. In this example, the database trigger is pulled by a database system at source system 102 when an insert, update, and/or delete system is applied to the database table, such as application table 114. In essence, when a change to a data item at source system 102 occurs and the data item has a corresponding trigger at database trigger 110, the source system 102 (or database at source system 102) pulls the corresponding trigger and then records the change to logging table 112. Returning to the previous example, the logging table 112 would record "delete from table Purchase_Order."

Next, the reader module 116 extracts the change(s) from the logging table 112. In some implementations, the reader module 116 may, at this point, perform an optimization to consolidate commands. For example, if the delete table Purchase_Order command is preceded with an update of the same data item at table Purchase_Order, the reader module 116 may consolidate the update command and the delete command to table Purchase_Order to a single command, e.g., delete record from table Purchase_Order. The reader module 116 may also process changes by confirming the accuracy of the change by referring to application table 114, which may be a database table reflecting the actual changes to data/tables of source system 102. Returning to the previous table Purchase_Order example, when the reader module 116 reads the change from the logging table 112 indicating delete table Purchase_Order, reader module 116 may also check for the actual deletion of table Purchase_Order at application table 114 to confirm the accuracy of the deletion of table Purchase_Order in source system 102. The application table 114 may thus be used to obtain a record that has been inserted, updated, deleted, and the like, and consistency checks may be provided by replication server 104 by comparing the latest entry in logging table 112 for a given record and the record itself stored in application table 114. For example, the record of the logging table 112 may correspond to an update command with the updated data; while the record in the application table 114 may, when consistent, also comprise the updated data.

The controller module 122 may couple to reader module 116 through a remote function call, although other types of communication mechanisms may be used as well. The controller module 122 at the replication server 104 may call the reader module 116 to obtain any changes extracted by the reader module 116. In some implementations, the call by the controller module 122 is periodically prompted by a module in replication server 104 as described further below with respect to the periodic analyzer module.

In some implementations, the controller module 122 may also include metadata defining the structure, data type, and the like of the change data being obtained from reader module 116. For example, the metadata may define the structure of the table Purchase_Order. Furthermore, if the change is an update to a table or a write to a table, the metadata may define any conversions or formats required for the target system 106. When a conversion is necessary between source system 102 and target system 106, the converter module 128 may use the metadata to perform the conversion.

The controller module 122 may call the writer module 120 and pass change data provided by the reader module 116 to writer module 120. The writer module 120 may be implemented in a format that is compatible with the target system 106 and its database. For example, if the source system 102 is implemented in a first format (e.g., ABAP) and the target system is implemented using SQL, the writer module 120 is able to receive commands in the first format and write to target system 106 in the second, SQL format.

The service layer 124 may be configured as an interface between the writer module 120 and the target system 106, which includes a database further including the application table 130. The service layer 124 may provide a direct connection to the target system 106 and the application table 130, and may be implemented to use the same commands as target system 106. For example, if the application table 130 corresponds to a table of an in-memory database configured to operate using SQL commands, the service layer 124 provides SQL commands to the target system 106. Returning to the previous delete from table Purchase_Order example, the service layer 124 may send the delete from table Purchase_Order command in SQL to application table 130, so that the in-memory database at target system 106 can delete table from Purchase_Order at application table 130.

Figure 2A:
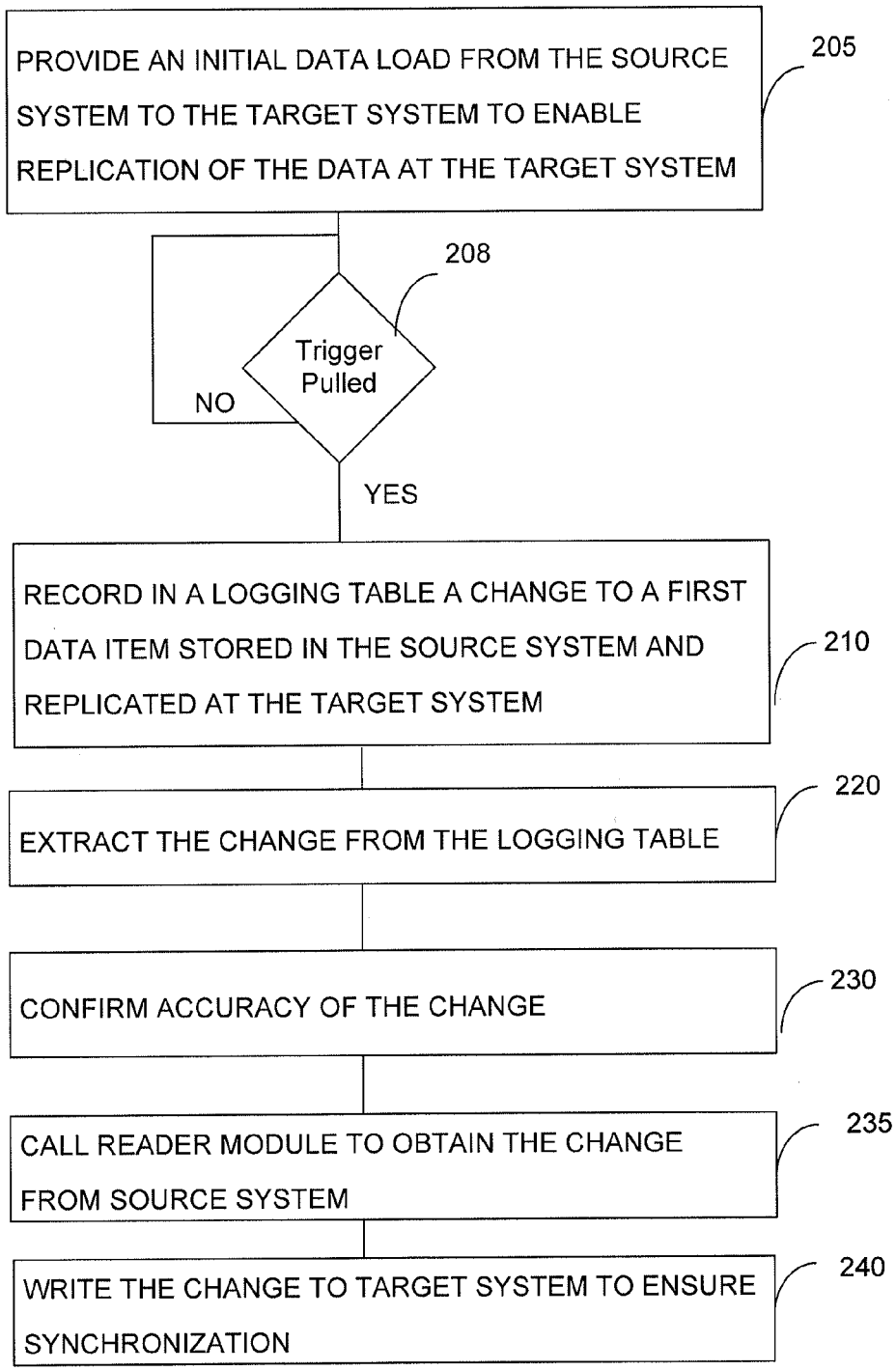
FIG. 2A depicts an example process for replicating data to a database.

FIG. 2A depicts an example process 200 for setting up an initial load and delta replication.

At 205, an initial load of data may be provided from source system 102 to target system 106 to enable copying of data to target system 106. For example, source system 102 may include a database with one or more tables, such as for example application table 114. A portion (e.g., one or more of the tables) of the data of the database at source system 102 may be loaded to a corresponding database at target system 106 for replication. When this is the case, one or more triggers may be created for each of the tables (or the data items in those tables) loaded into target system. For example, if tables A, B, C, and Purchase_Order are replicated from source system 102 to target system 106, database triggers may be created and stored in database triggers 110 for each of the tables A, B, C, and Purchase_Order. The database triggers 110 may be implemented as an object of a database (e.g., database object) assigned to database table(s) to react on commands, such as for example, insert, update, delete, and the like. Table 1 below depicts an example of a create trigger statement.

TABLE 1

CREATE TRIGGER "00000426INS" FOR "EKPO" AFTER INSERT
    EXECUTE (
      BEGIN
        INSERT INTO user."/1CADMC/00000426"
            VALUES ( "SEQ_/1CADMC/00000426".NEXTVAL,
            TO_CHAR(TIMESTAMP, 'yyyymmddhh24missMs'),
        ' ',
        :NEW."MANDT" ,
        :NEW."EBELN" ,
        :NEW."EBELP",
'I');
      END;
)

After the initial load at 205, system 100 (e.g., source system 102 and/or a database management system therein) monitors any changes to data items at source system 102 to determine whether one or more triggers at database triggers 110 should be pulled. When a trigger is pulled (yes at 208) at database triggers 110, the process 200 proceeds to 210.

At 210, when a change causes a trigger at database triggers 110 to be pulled, the change is recorded in logging table 112. Specifically, the command and/or the change to the data item are recorded in order to replicate the change at target system 106. For example, if the change corresponds to an update data value X to Y at table Purchase_Order at table 114, the logging table 112 may record update X to Y at table Purchase_Order, so the change can be replicated at table 130.

At 220, the reader module 116 extracts the change from the logging table. The reader module 116 may also perform optimization to consolidate commands if one or more commands are applicable to the same record in one table.

At 230, the reader module 116 may also process changes from the logging table 112 by confirming the accuracy of the change. For example, reader module 116 may confirm a change by referring to the actual data source, such as for example application table 114 at source system 102. Returning to the previous delete data value Y at table 114 example, when the reader module 116 checks application table 114, the data value will show Y as deleted and thus the check confirms the accuracy of the deletion of the data value Y.

At 235, the controller module 122 may call the reader module 116 to obtain any changes. For example, the controller module 122 may call the reader module 116 which returns a list of records and a corresponding operation (e.g., insert, update, delete, and the like) to be applied to target system 106. In some implementations, the controller module 122 at the replication server 104 may call the reader module 116 with a remote function call and then obtain any changes extracted by the reader module 116. As noted, the controller module 122 may also include metadata associated with the change(s). When this is the case, the metadata may be used by converter module 128 to convert the change(s) or data items associated with the change(s) to the format required by the target system 106.

At 240, the change is written to the target system 106. For example, the writer module 120 may write the change to the application table 130 via the service layer interface 124.

The system 100 may be configured to handle different types of tables at the source system 102 and the target system 106 by using metadata to define the table types and data types. Data may be selected for synchronization based on a list of one or more database triggers defined in the database trigger 110 for each table that is subject to the initial load and thus replication from source system 102 to target system 106. Moreover, filters may be defined for specific tables to allow system 100 to recognize the need to synchronize a change to target system 106. Filtering may be used in some implementations. For example, one or more filters may be defined in the trigger coding or the converter module.

Figure 2B:
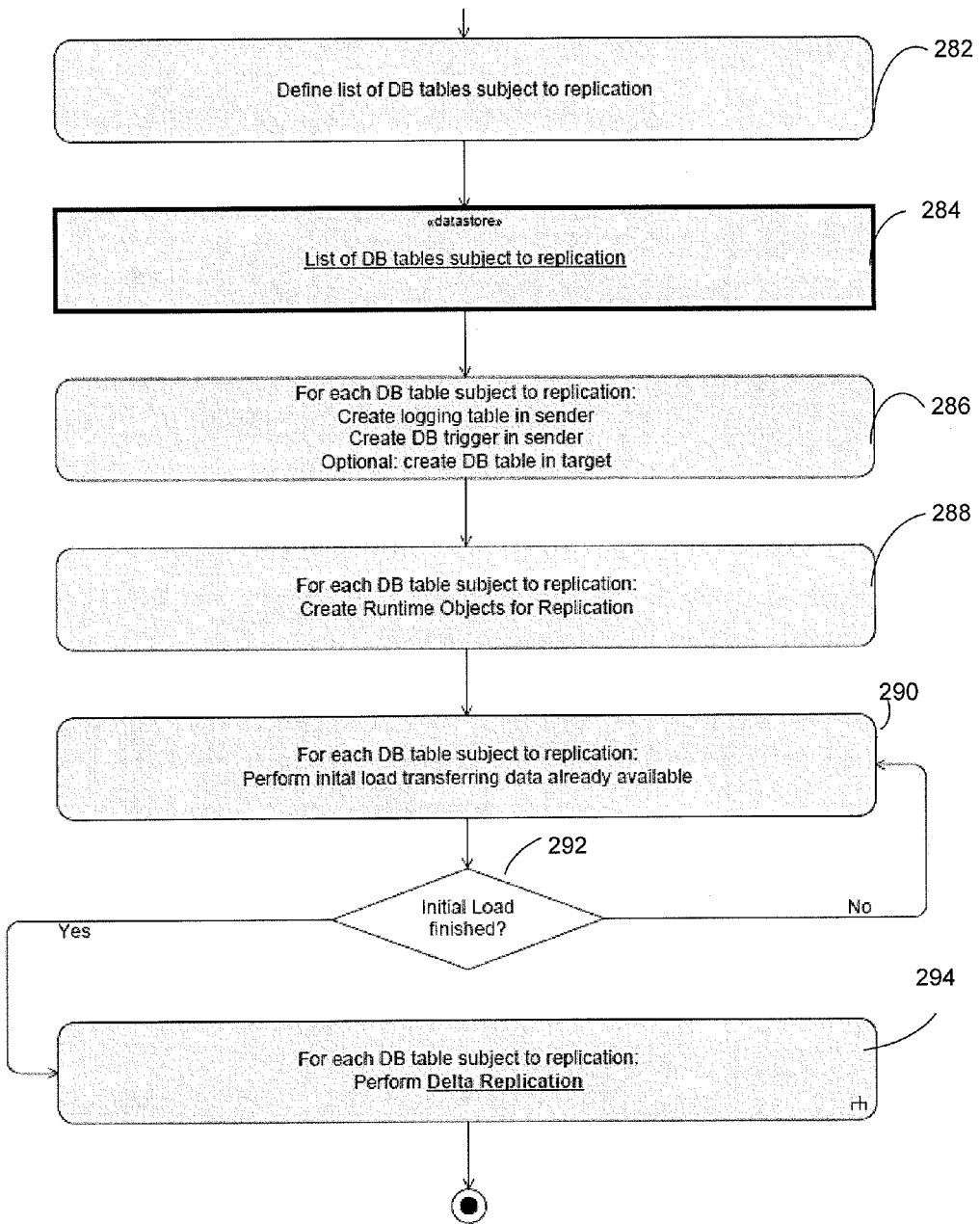
FIG. 2B depicts an example process for an initial load.

FIG. 2B depicts a process which may be implemented in connection with system 100 to provide an initial load from source system 102 to target system 106.

At 282, a list of tables, such as application table 114, at source system 102 may be defined such that the tables are the subject of replication to target system 106. At 284, a list of tables that are at source system 102 and are subject to replication is stored.

At 286, for each application table (also referred to as database table) subject to replication, a logging table, such as logging table 114, is created at the source system 102. For each table at the source system 102 subject to replication, a database trigger, such as database trigger 110, is created at the source system 102. Moreover, for each application table (also referred to as database table and table) subject to replication, a database table, such as table 130, is created at the target system 106.

At 288, for each application table subject to replication at the source system 102, runtime objects are created for the initial load and the replication. At 290, for each application table subject to replication at the source system 102, the application table is loaded as an initial load into the target system 106. When the initial load is finished (yes at 292), at 290, each application table subject to replication at the source system 102 is then monitored (e.g., by database triggers 110), so that any changes to an application table subject to replication at the source system 102 can be recorded in a logging table and then posted, at 294, to a corresponding table at the target system 106. In some implementations, recording to the log table starts before an initial load and as soon as triggers are created in 286, the triggers are active and will be pulled on a change, such as an insert, update, delete, and the like. This posting of changes at the source system 102 to the target system 106 is referred to as delta replication, which may be an ongoing process based on any changes occurring at the tables subject to replication at the source system 102.

Figure 2C:
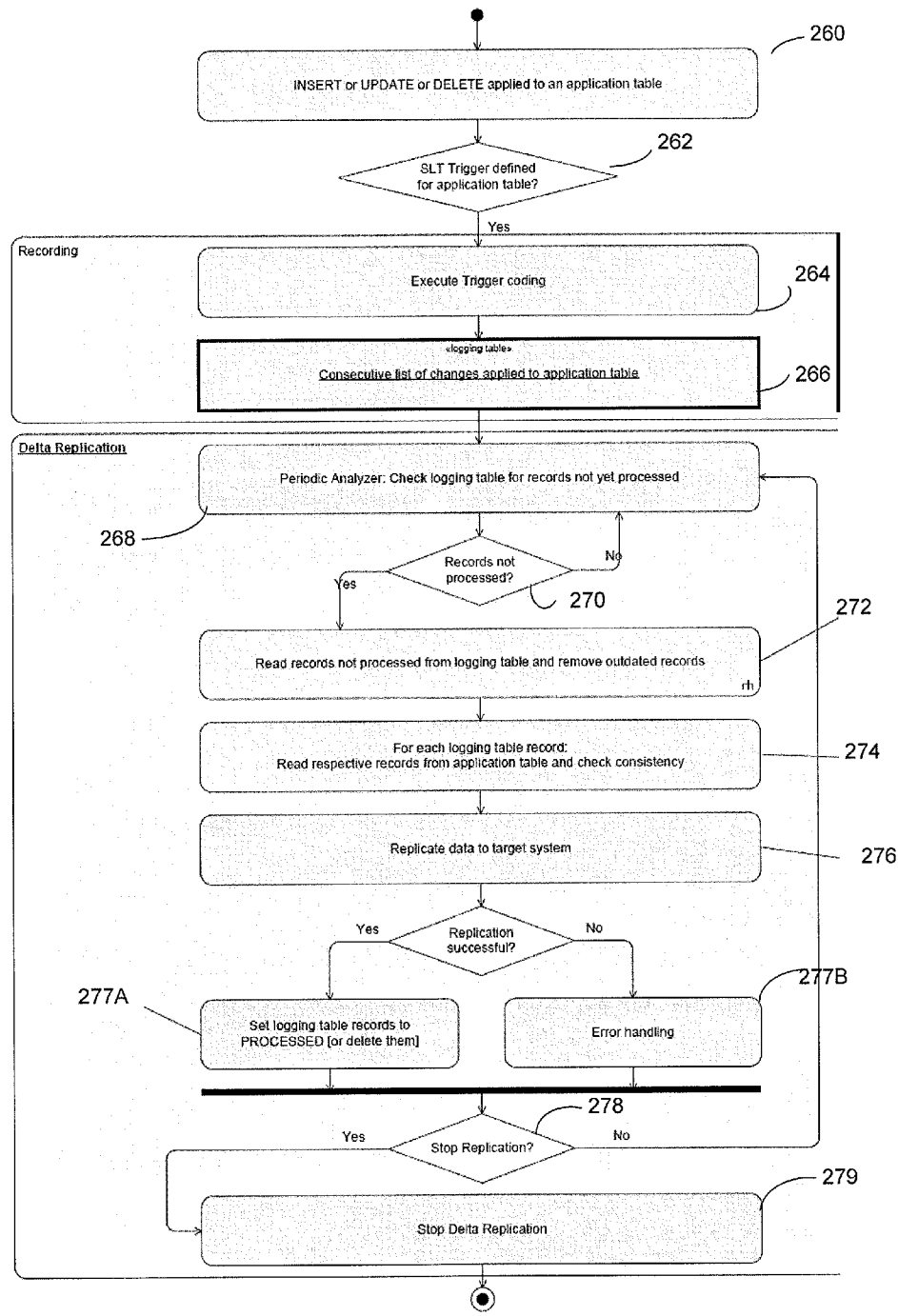
FIG. 2C depicts an example process for recording and replicating changes.

FIG. 2C depicts a process which may be implemented in connection with system 100 after the initial load described with respect to FIG. 2B. At 260, a change, such as an insert, update, or delete may be applied to a database table, such as application table 114. When a database trigger, such as database trigger 110, is defined for an application table, such as application table 114 (yes at 262), the database trigger is executed at 264. Next, the one or more changes applied to the application table 114 are recorded, at 266, in logging table 112 (which is associated with application table 114). At 268, a periodic analyzer module at replication server 104 may periodically check the logging table 114 for records that have not yet been processed. In some implementations, the periodic analyzer module is incorporated into the controller module 122, although the periodic analyzer module may be implemented as a separate module in the replication server 104 as well. In case there are records not processed (yes at 270), the records will be read from the logging table and preprocessed (see, e.g., FIG. 2D). The records represent recorded changes including commands and/or the actual data being changed. For each record at the logging table 114, records are read from the application table 114 and checked for consistency at 274. Next, the data is replicated to the target system at 276. If the replication is successful, the records in the logging table may be annotated, at 277A, as "processed" (or deleted). If the replication is not successful, an error indication may be flagged, at 277B. At 279, replication may stop (279) or proceed to 268.

Figure 2D:
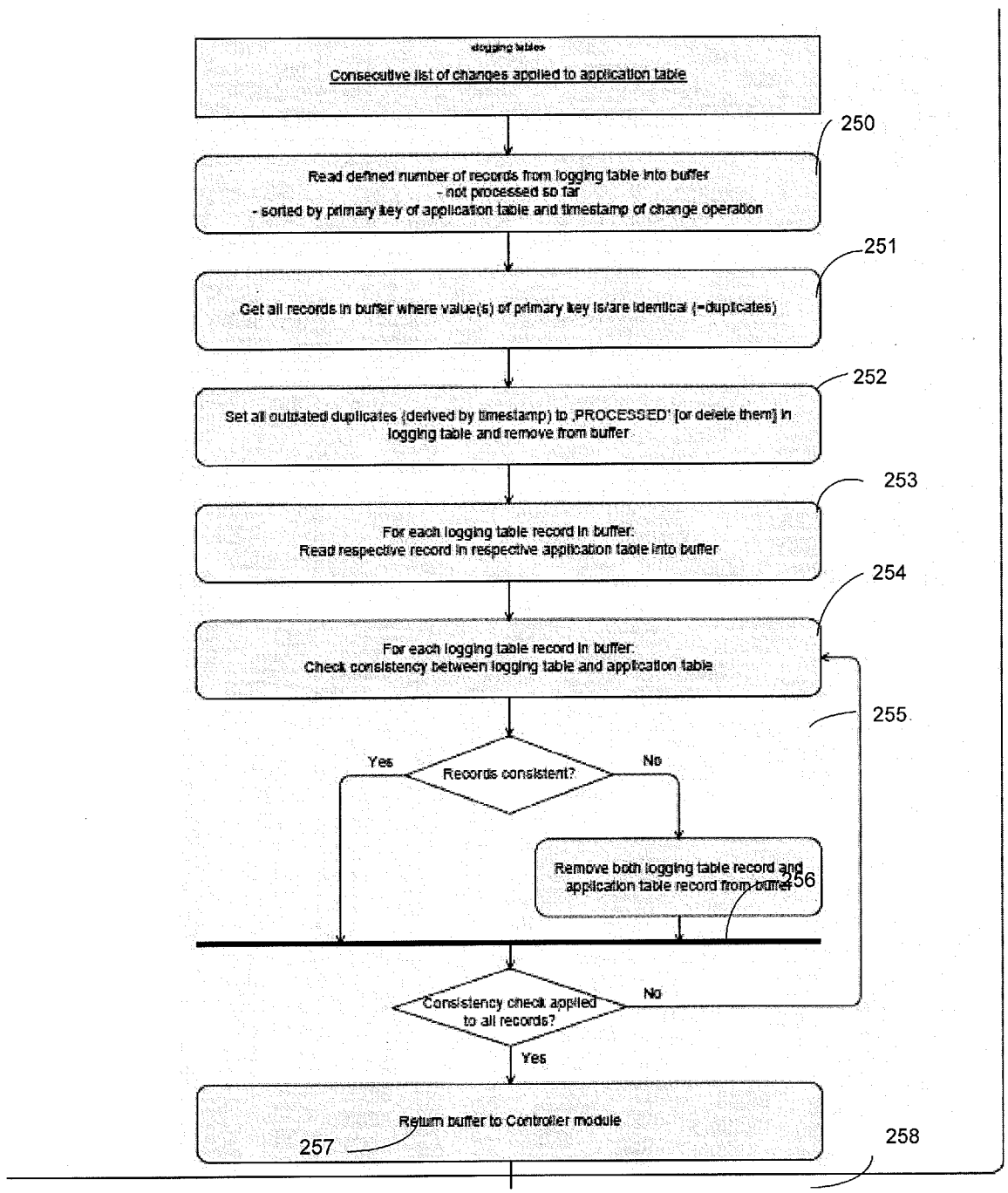
FIG. 2D depicts an example process for processing logging tables and checking consistency.

FIG. 2D depicts a process which may be implemented in connection with logging tables at source system 102. At 250, any changes applied to an application table may be recorded in a corresponding logging table. For example, any changes applied to the application table 114 may be recorded in the logging table 112. At 251, records representing the changes to the application tables at the source system may be read from the logging table. The read changes may be placed into a buffer for processing, such as sorting. Next, any records in the buffer that are duplicates may be obtained at 252. At 253, any outdated records may be deleted from (or, e.g., marked processed) in the logging table 112. At 254, for each logging table record in the buffer, a record in application table 114 is read into the buffer. At 255, for each logging table record in the buffer, a consistency check is performed between the logging table record and the record from the application table. If the logging table record and the application table record are not consistent, the logging table record and the application table record may be removed from the buffer, at 256. The inconsistencies may be caused by changes applied to application table 114 shortly after logging table records have been read from logging table 112. And, rejected logging table records may be processed again at 272.f the logging table record and the application table record are consistent and the check of all of the records in the buffer have been completed, at 255 the logging table records in the buffer are provided to the controller module 122 to allow reading the changes and posting them to target system 106.

Figure 3:
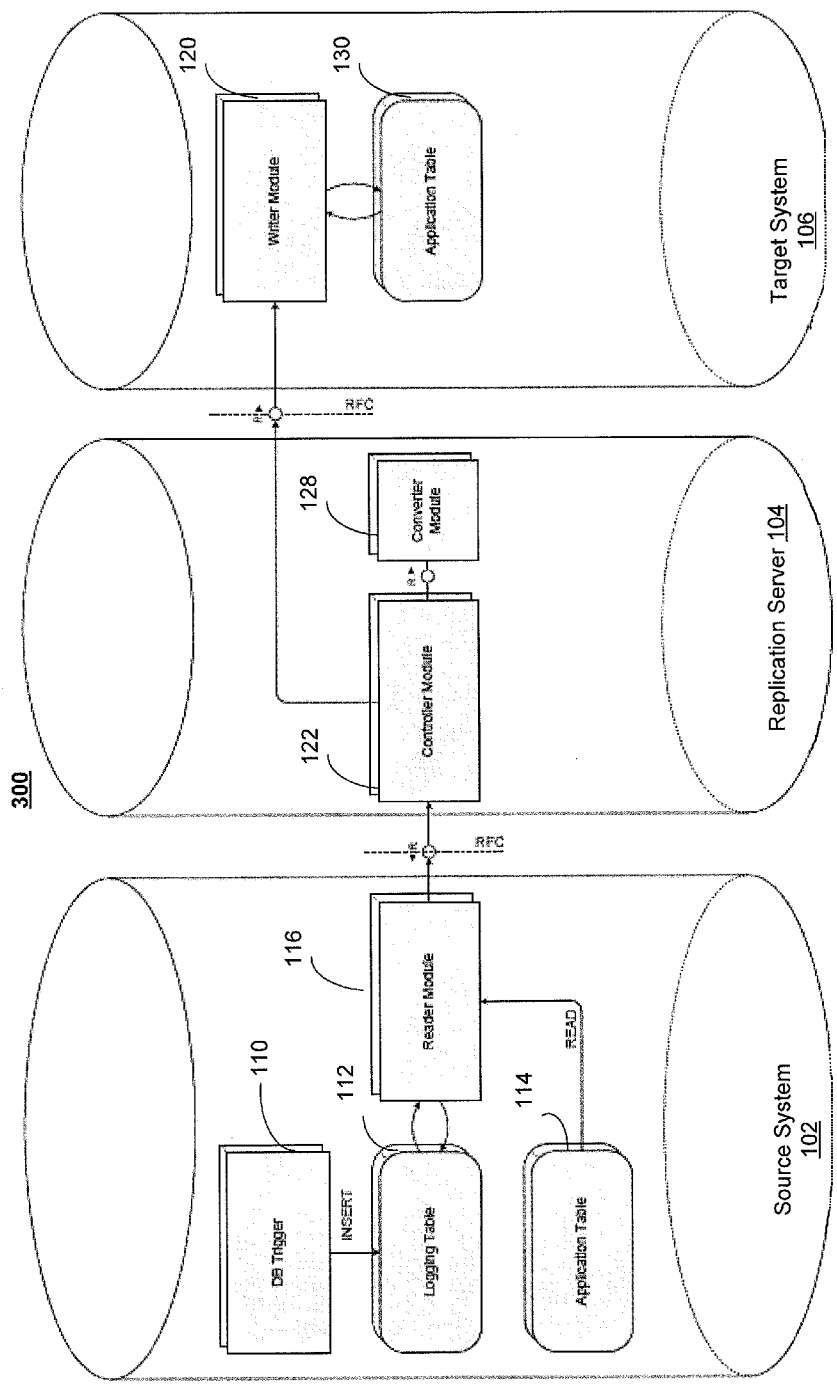
FIGS. 3-5 depict block diagrams of example systems for replicating data.

FIG. 3 depicts a system 300. System 300 is similar to system 100 in some respects but the writer module 120 is configured at the target system 106 rather than the replication server 104. In addition, system 300 does not include service layer 124.

Figure 4:
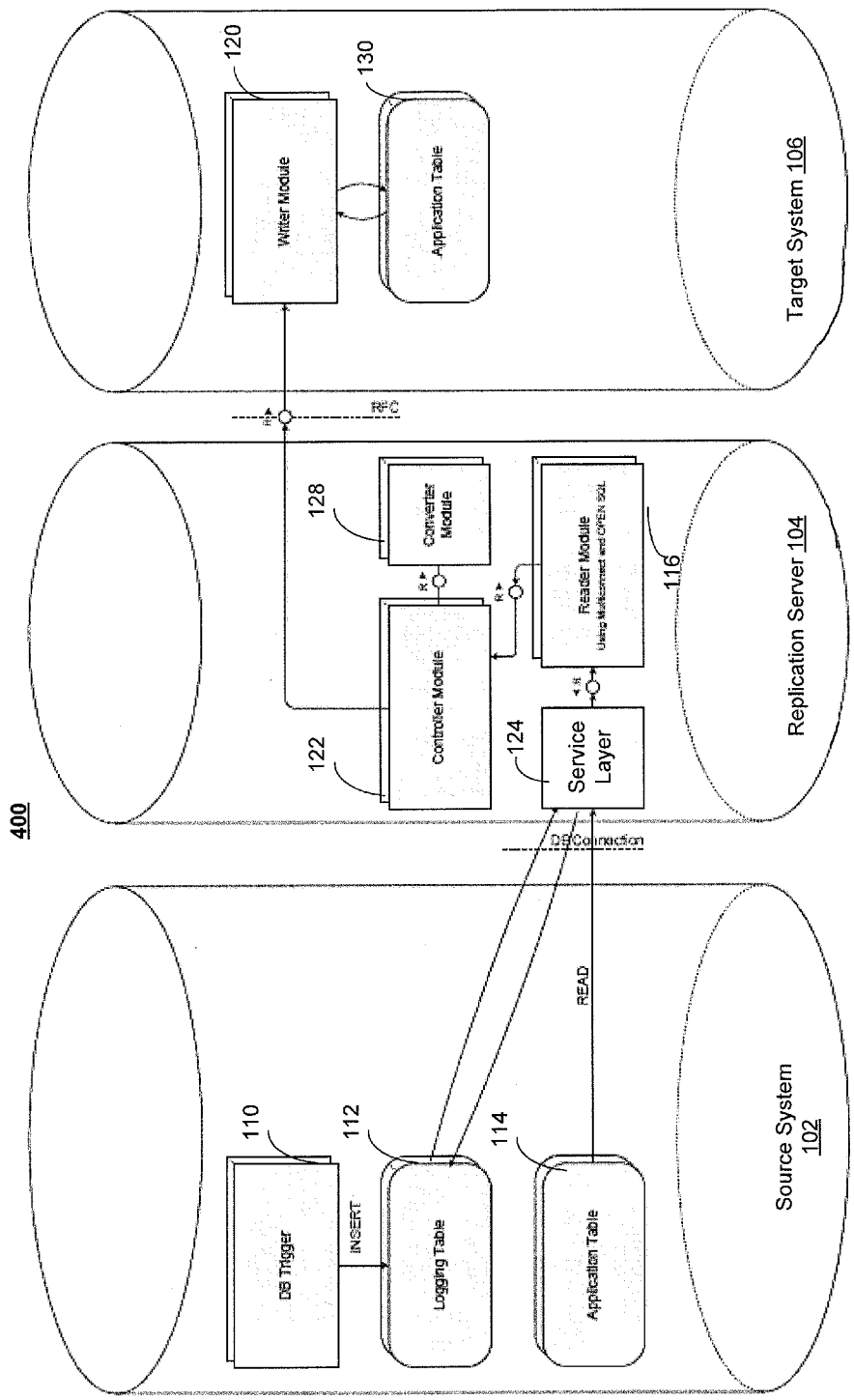

FIG. 4 depicts a system 400. System 400 is similar to system 100 in some respects but the writer module 120 is configured at the target system 106 rather than the replication server 104. Furthermore, the reader module 116 is configured at the replication server 104, rather than the source system 102. Moreover, the service layer 124 interfaces the source system 102 rather than the target system 106.

Figure 5:
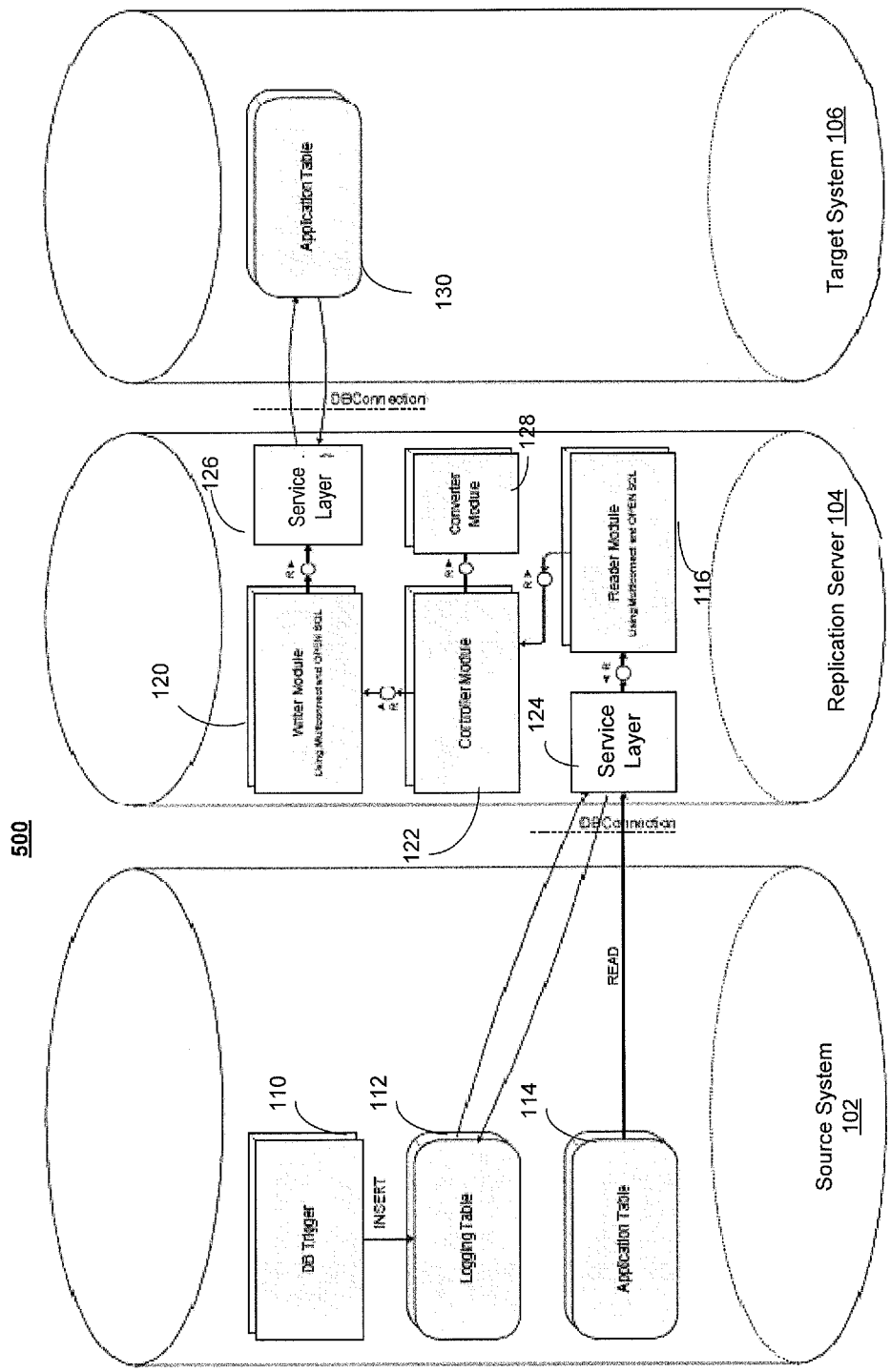

FIG. 5 depicts a system 500. System 500 is similar to system 100 in some respects but the reader module 116 is configured at the replication server 104 rather than the source system 102. Furthermore, replication server 104 includes two service layers 124 and 126.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet. As used herein, the term "module" refers to at least one processor and at least one memory including code which when executed by the at least one processor configures the module.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A computer-readable storage medium containing instructions to configure a processor to perform a method, the method comprising:
   providing, by a source system, an initial load of a data item from the source system to a target system, wherein the data item is associated with a database trigger maintained at the source system;
   recording, by the source system, a change in a log at the source system, when a change to the data item at the source system causes the trigger to prompt the recording;
   extracting, by the source system, the change from the log to enable at least a confirmation of an accuracy of the change;
   receiving, at the source system, a call from a replication server; and
   providing, in response to the received call, the extracted change to the replication server configured to write the change to the target system.

2. The computer-readable storage medium of claim 1, wherein the database trigger comprises a database object linked to a table including the data item.

3. The computer-readable storage medium of claim 1, wherein the providing the initial load further comprises:
   writing the data item to a database table at the target system.

4. The computer-readable storage medium of claim 3, wherein the database table comprises at least one of a plurality of database tables of at least one of an in-memory database and a column-oriented database.

5. The computer-readable storage medium of claim 1 further comprising:
   initialing, by the replication server, the initial load of the data item from the source system to the target system, wherein the replication server comprises at least a controller.

6. The computer-readable storage medium of claim 1, wherein the change comprises at least one of an insert, a create, and a delete.

7. The computer-readable storage medium of claim 1, wherein the extracting further comprises:
   determining the consistency based on a comparison of the log and a table including the data item at the source system.

8. A method comprising:
   providing, by a source system, an initial load of a data item from the source system to a target system, wherein the data item is associated with a database trigger maintained at the source system;
   recording, by the source system, a change in a log at the source system, when a change to the data item at the source system causes the trigger to prompt the recording;
   extracting, by the source system, the change from the log to enable at least a confirmation of an accuracy of the change;
   receiving, at the source system, a call from a replication server; and
   providing, in response to the received call, the extracted change to the replication server configured to write the change to the target system.

9. The method of claim 8, wherein the database trigger comprises a database object linked to a table including the data item.

10. The method of claim 8, wherein the providing the initial load further comprises:
    writing the data item to a database table at the target system.

11. The method of claim 10, wherein the database table comprises at least one of a plurality of database tables of at least one of an in-memory database and a column-oriented database.

12. The method of claim 8 further comprising:
    initialing, by the replication server, the initial load of the data item from the source system to the target system, wherein the replication server comprises at least a controller.

13. The method of claim 8, wherein the change comprises at least one of at least one of an insert, a create, and a delete.

14. The method of claim 8, wherein the extracting further comprises:
    determining the consistency based on a comparison of the log and a table including the data item at the source system.

15. A system comprising:
    at least one processor; and
    at least one memory including code which when executed by the at least one processor provides operations comprising:
    providing, by a source system, an initial load of a data item from the source system to a target system, wherein the data item is associated with a database trigger maintained at the source system;
    recording, by the source system, a change in a log at the source system, when a change to the data item at the source system causes the trigger to prompt the recording;
    extracting, by the source system, the change from the log to enable at least a confirmation of an accuracy of the change;
    receiving, at the source system, a call from a replication server; and
    providing, in response to the received call, the extracted change to the replication server configured to write the change to the target system.

16. The system of claim 15, wherein the database trigger comprises a database object linked to a table including the data item.

17. The system of claim 15, wherein the providing the initial load further comprises:
    writing the data item to a database table at the target system.

18. The system of claim 15, wherein the database table comprises at least one of a plurality of database tables of at least one of an in-memory database and a column-oriented database.

19. The system of claim 15 further comprising:
    initialing, by the replication server, the initial load of the data item from the source system to the target system, wherein the replication server comprises at least a controller.

20. The system of claim 15, wherein the change comprises at least one of at least one of an insert, a create, and a delete.

* * * * *